United States Patent Office 3,840,496
Patented Oct. 8, 1974

---

3,840,496
POLYURETHANE POLYMERS BASED ON ISOCYANURATE SALTS
Perry A. Argabright, Larkspur, and Brian L. Phillips and Larry M. Echelberger, Littleton, Colo., assignors to Marathon Oil Company, Findlay, Ohio
Filed Nov. 4, 1971, Ser. No. 195,813
Int. Cl. C08g 22/00
U.S. Cl. 260—77.5 NC
11 Claims

ABSTRACT OF THE DISCLOSURE

Polyelectrolyte polymers are prepared from a diisocyanate and a metal cyanate in the presence of an aprotic solvent followed by reaction with a diol. The polyelectrolytes contain isocyanurate rings, metal-substituted isocyanurate rings and

—NH—CO—O—R'—O—OC—NH— groups.

CROSS REFERENCES TO RELATED APPLICATIONS

The following U.S. Patent applications relate to compounds and uses which are generally related to the present invention:

S.N. 157,236, filed June 28, 1971, now U.S. Pat. No. 3,766,086;
S.N. 224,905, filed Feb. 9, 1971;
S.N. 224,904, filed Feb. 9, 1972, and now U.S. Pat. No. 3,779,940;
S.N. 195,812, filed Nov. 4, 1971, and now as U.S. Pat. No. 3,817,937;
S.N. 715,199, filed Mar. 28, 1968;
S.N. 89,883, filed Nov. 16, 1970;
S.N. 72,388, filed Sept. 15, 1970;
S.N. 72,288, filed Sept. 15, 1970.

BACKGROUND OF THE INVENTION

Field of the Invention

The present invention relates generally to the field of isocyanurate-containing organic compounds generally classified within Class 260, subclass 77.5 N.C. of the United States Patent Office.

DESCRIPTION OF THE PRIOR ART

The present invention is concerned with a new class of polymers. Prior art which might generally be considered relevant is: U.S. Pats. 2,536,849; 2,866,801; 2,866,802; 2,993,870; 3,108,100; 3,211,704; 3,249,607; 3,259,626; 3,458,448; and 3,573,259.

However, none of the above teaches polymers containing groups of the structure shown in FIG. 1, nor teaches the process for production of such polymers as disclosed in the present application.

SUMMARY OF THE INVENTION

General Statement of the Invention

The present invention relates to a new class of polymers which are useful as water thickening agents and emulsifiers. These compounds are characterized by containing the structure shown in FIG. 1 of the present application; wherein:

R=divalent hydrocarbon or substituted hydrocarbon radical, as described below and exemplified in FIGS. 2 and 3,
X=a metal, or hydrogen or quaternary ammonium (which, for the purposes of this invention, acts like a metal) or a combination thereof. Particularly preferred are hydrogen, quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir;
R'=divalent hydrocarbon or substituted hydrocarbon radical, as discussed below;
m=number of trisubstituted isocyanurate rings and is a positive integer preferably from 0 to about 2000, and most preferably from 1 to about 200;
n=number of isocyanuric acid and/or isocyanurate salt groups and is a positive integer from 1 to about 10,000, more preferably from 2 to about 1,000, and most preferably from 3 to about 200;
$2m+n+1$=number of divalent R groups and is a positive integer from 2 to about 14,000, more preferably from 5 to about 1,400 and most preferably from 6 to about 600;
p=the number of repeating units (mers) in the polymer. For individual molecules p will be an integer from about 1 to about 2000, more preferably from about 1 to about 1000, and most preferably from 2 to about 200.

And wherein there are no N-to-N bonds, no O-to-N bonds, no O-to-O bonds, no R-to-O bonds, no R-to-R bonds, and no R'-to-N bonds; R preferably contains 1 to 40, more preferably 2 to 30, and most preferably 2 to 18 carbon atoms; R' preferably contains 1 to 40 carbon atoms, more preferably 1 to 20 carbon atoms and most preferably 1 to 10 carbons, for example:

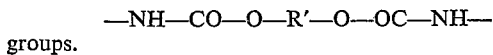

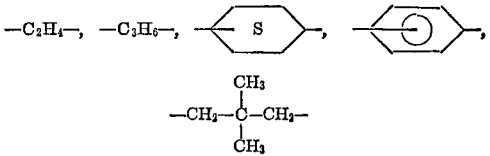

R and/or R' can be substituted with groups that do not interfere in the product's subsequent utility or in its preparation; examples of such non-interfering groups are: —NO₂, Cl, F, Br, I, CN, —CO₂R", —CO—R", —O—R", —SR", NR₂", —CONR₂", —SO₃R", —SO₂—, —SO—, phenyl, naphthyl, alkyl (1–40 carbon atoms), cyclohexyl, cyclopropyl, —OCOR",

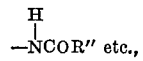

where R" can be lower alkyl (e.g., ethyl, hexyl) or aryl monovalent radicals. The examples of R and R' (shown in FIGS. 2 and 3) are set forth for purposes of elucidation, not restriction.

It will be recognized that the values of m, n, and p described above are on the basis of the integers which will be used to describe a single molecule. In actual practice, the invention will involve mixtures of molecules of the general form described above. Thus, the average value of m for the mixture can be from about 1 to about 1000, more preferably from about 2 to 500, and most preferably from about 3 to 200; the average value of n can be from about 1 to 5,000, more preferably from about 2.0 to 1,000, and most preferably from about 4 to 200; the value of p can be from about 1 to 1,000, more preferably from 1 to 500, and most preferably from 4 to 200.

UTILITY OF THE INVENTION

The present invention relates to a new class of polymers and their preparation. For example, the compounds of the present invention may be used as emulsifying agents, e.g., in producing emulsions of water and oils or other immiscible materials. The products are merely added to the other emulsion ingredients and the mixture vigorously agitated to produce the emulsion.

DESCRIPTION OF THE PPREFERRED EMBODIMENTS

Starting Materials: Diisocyanates

Figure 1:
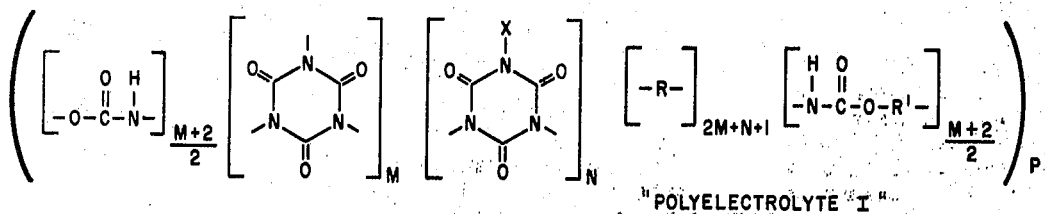
FIG. 1 shows the general formula of the products of the present invention.
Figure 2:
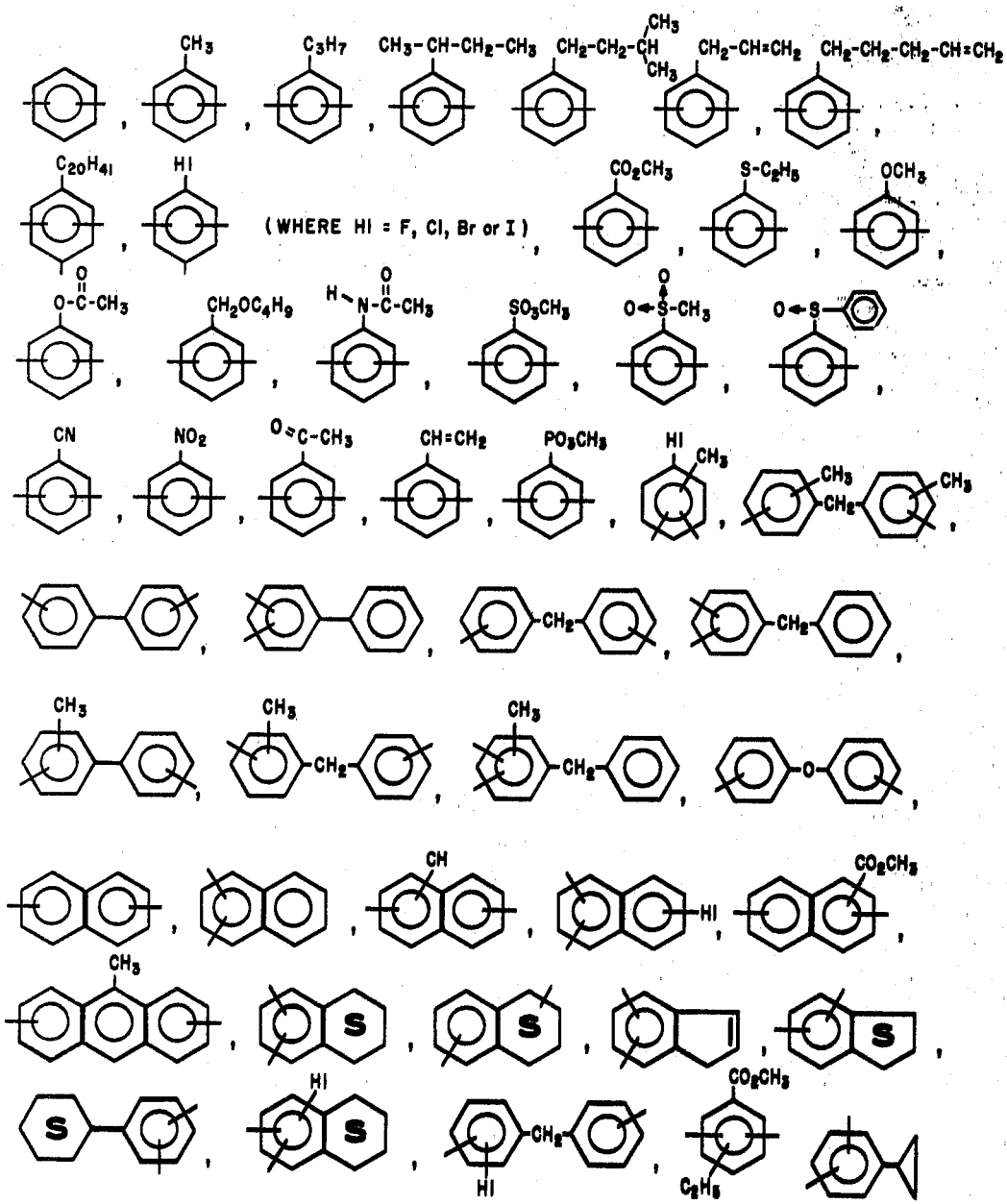
FIGS. 2 and 3 exemplify some of the possible structures of R and R' groups of the starting materials and products of the present invention.
Figure 3:
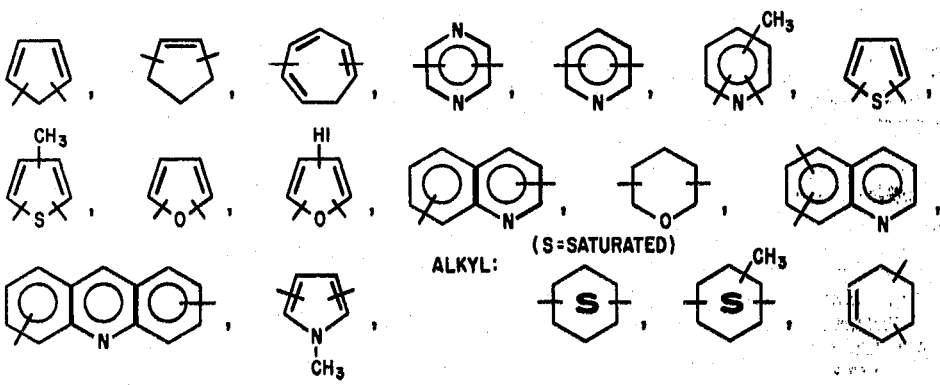
Figure 3:
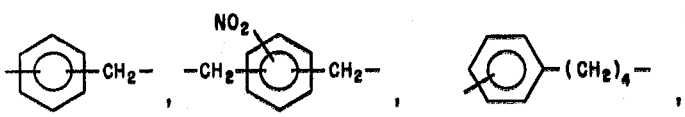
Figure 3:
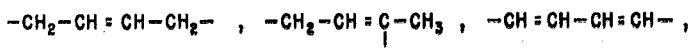
Figure 3:
Figure 3:
Figure 4:
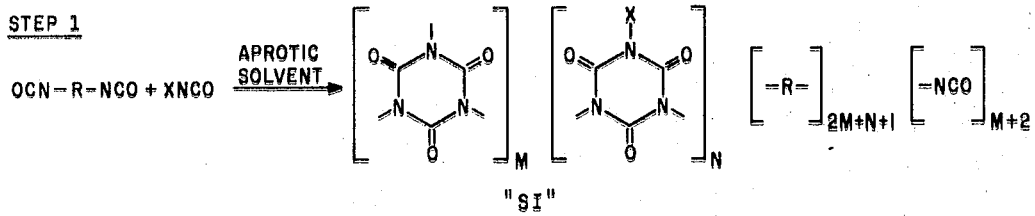
FIG. 4 shows the general reaction formula of the present invention. For purposes of the reaction shown in this figure, X may not be a hydrogen atom, but may be any other of the species shown in its definition under General Statement of the Invention. A metal X in FIG. 1 may be converted to a hydrogen by acidifying the polymeric product.
Figure 4:

Organic diisocyanates having utility for the present invention are characterized by the following structural formula:

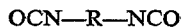

OCN—R—NCO wherein R may be aryl such as:

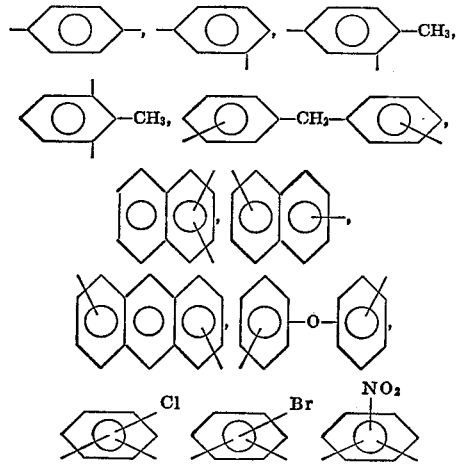

or other non-interfering substituted derivatives or compatible mixtures thereof. R may also be alkyl or olefinic. There are preferably from 1 to 40 carbon atoms, and more preferably from 2 to 30 carbon atoms, and most preferably 2 to 18 carbon atoms per R group. R may also be aralkyl such as

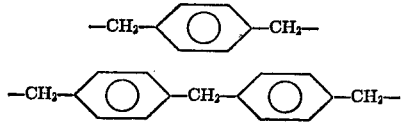

or noninterfering substituted derivatives thereof. R may also be a compatible mixture of any of aryl, alkyl, and aralkyl. R is preferably aryl, aralkyl or a noninterfering substituted derivative thereof, and the most preferred organic diisocyanate is 2,4-tolylene diisocyanate. Other examples of organic diisocyanates useful for this invention are: alkyl diisocyanates such as ethylene diisocyanate, trimethylene diisocyanate, tetramethylene diisocyanate, pentamethylene diisocyanate, 2-methyl-1,3-diisocyanatobutane, 1,3-diisocyanatocyclopentane, hexamethylene diisocyanate, octamethylene diisocyanate, dodecamethylene diisocyanate, and the like, or compatible mixtures thereof.

Metal Cyanates: Preferred metal cyanates are those of the alkali or alkaline earth metals, for example; Li, Na, K, Rb, Cc, Be, Mg, Ca, etc. as listed in the definition of X above.

Aprotic Solvents: The aprotic solvents having utility in this connection are characterized in that (1) they are liquid under the conditions of the reaction; (2) they have a high dielectric constant, i.e., greater than about 15 at 25° C.; (3) they preferably are dipolar, that is one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture. A mixture of solvents satisfying the foregoing criteria can be employed. Exemplary of solvents useful in carrying out the method are: alkyl pyrrolidones such as N-methyl-pyrrolidone-2 and N-ethylpyrrolidone-2; sulfoxides exemplified by dimethylsulfoxide, and diethylsulfoxide; alkyl amides including N,N-dimethylformamide, N,N-diethylformamide, N,N-dimethylacetamide and N,N-diethylacetamide; alkylphosphoramides and arylphosphoramides such as hexamethylphosphoramide, hexaethylphosphoramide, and hexaphenylphosphoramide; nitriles; examples of which are acetonitrile and benzonitrile; alkylureas such as tetramethylurea and tetraethylurea; and the like; and compatible mixtures thereof.

The quantity of solvent used is variable. From a practical standpoint, only so much of the solvent need be employed as is required to facilitate both maintenance of the desired temperature conditions and work-up of the end product. Generally speaking, the quantity of solvent used will range from about 0.5 to about 20, usually about 1 to about 5, liters per mole of organic diisocyanate employed.

Diols: The diol will have the general formula:

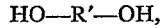

HO—R'—OH, where R' is as discussed above. Mixtures of diols can be employed.

Mole Ratios: The preferred mole ratio of NCO groups to metal cyanate is from about 1 to about 10, more preferably from 1 to about 5, and most preferably from 1 to about 3. The preferred moles of free NCO in the "SI" product per mole of OH group in the diol is from about .1 to about 1.5, more preferably from 0.2 to about 1.2, and most preferably from 0.8 to about 1.1.

Temperature: While not narrowly critical, the temperature will preferably be in the range from about 0 to about 300° C., more preferably from about 20 to about 200° C., and most preferably from about 20 to about 125° C.

Pressure: The reaction will normally be conducted at atmospheric pressure, though elevated or reduced pressures may be utilized if desired because of special circumstances.

Time: The diol is preferably added more or less continuously over a moderately long time period. Preferably it is added over a period of from about 0.01 to 100 hours, more preferably from 0.1 to 50 hours, and most preferably from about 1 to 10 hours. The diol addition should begin after substantial completion of the reaction between the diisocyanate and the metal cyanate.

Generally, the diisocyanate-metal cyanate reaction is accomplished by adding the diisocyanate relatively slowly to a slurry of the metal cyanate in the reaction solvent. While the time for addition of the diisocyanate will vary depending upon the specific compounds being utilized, in general it will be in the range of from about 0.01 to about 100 hours, more preferably from 0.5 to about 50 hours, and most preferably from 0.3 to about 24 hours. Various modifications can be utilized for the addition of the starting materials and these will be readily apparent to those skilled in the art.

EXAMPLES

Example I

To a slurry of 20.6 g. (.25 mole) of KOCN in 500 ml. of dry dimethylformamide (DMF) at 75° C. is added over 61 minutes, 0.25 mole of 2,4-tolylenediisocyanate (TDI). The reaction is carried out in a nitrogen atmosphere. The mixture is stirred at 75° C. for 5 minutes after completion of the TDI addition and an aliquot taken. Then the addition of 2 ml. of ethylene glycol is begun and requires 146 minutes. After an additional 15 minutes, 20 ml. of dry methanol is added to the reaction, and a small amount is added to the sample withdrawn earlier. The mixture is stirred at 75° C. overnight. The cooled reaction mixture is filtered, and the recovered insolubles are extracted with acetone in a Soxhlet apparatus for 2 days. The resulting solid (59.1 g.) is analyzed by nuclear magnetic resonance (NMR) spectroscopy and is found to contain no DMF and the mole ratio $$2m+n+1/R'$$

is about 18.

There is no indication of residual isocyanate because no —NH—CO—OCH₃ groups are present in the NMR.

The small aliquot, removed prior to addition of ethylene glycol, is worked up in a similar manner, and is found to contain approximately eight (8) R groups for every end group (—NH—CO—OCH₃).

Example II

According to the method of Example I, an intermediate polyelectrolyte is prepared from 16.3 g. NaOCN and 0.25 mole TDI. In this case, the intermediate product is soluble in DMF. A small sample is reserved, and 2 ml. of ethylene glycol is added to the reaction mixture over 30 minutes. A precipitate is formed during this period. The reaction is stirred at 75° C. for an additional 65 minutes and 60 ml. of CH₃OH is added. The reaction mixture is stirred overnight at room temperature.

The precipitate is isolated by filtration and is extracted with acetone as in Example I. The product (59.5 g.) is analyzed by NMR finding the mole ratio of $$2m+n+1/R'$$

is about 10, and the mole ratio of aryl groups to

—NH—CO—OCH₃ groups is approximately 8.8.

The product from the small sample removed prior to addition of ethyleneglycol, is soluble in DMF. The product is obtained by removal of the DMF. After extraction with acetone, it is analyzed by NMR, and the mole ratio of aryl group to —NH—CO—OCH₃ groups is about 3.0.

Modifications of the Invention

It should be understood that the invention is capable of a variety of modifications and variations which will be made apparent to those skilled in the art by reading of the specification and which are to be included within the spirit of the claims appended hereto.

It is an important feature of the present invention that the gross reaction product of the diisocyanate-metal cyanate reaction can be utilized without intermediate purification or isolation of any sort. As will be recognized, this surprising ability to avoid purification contributes substantially to the economy which is inherent in the processes of the invention. Each of the examples exemplifies the use of gross reaction mixture. However, it should be understood that in specialized instances conventional purification, techniques, e.g., filtration, washing with organic solvents, etc., can be employed so long as contact with active hydrogen compounds is avoided.

What is claimed is:

1. Polymeric compositions comprising mixtures of molecules containing groups having the structure:

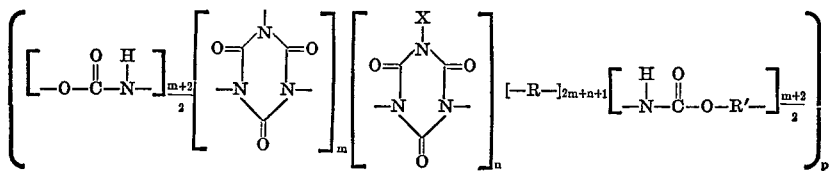

wherein
R=divalent hydrocarbon or substituted hydrocarbon radical, containing 1 to about 40 carbon atoms,
X=a metal, or hydrogen or quartenary ammonium or a combination thereof;
R'=divalent hydrocarbon or substituted hydrocarbon radical, containing 1 to about 40 carbon atoms,
$m$=number of trisubstituted isocyanurate rings and is a positive integer from 0 to about 2000,
$n$=number of isocyanuric acid and/or isocyanurate salt groups and is a positive integer from 1 to about 10,000,
$2m+n+1$=number of divalent R groups and is a positive integer from 2 to about 14,000,
$p$=the number of repeating units (mers) in the polymer; for individual molecules $p$ will be an integer from about 1 to about 2000,
and wherein there are no N-to-N bonds and no O-to-N bonds, no O-to-O bonds, no R-to-R, R-to-O and R'-to-N bonds.

2. A process for the manufacture of polymers comprising mixtures of molecules having the structure:

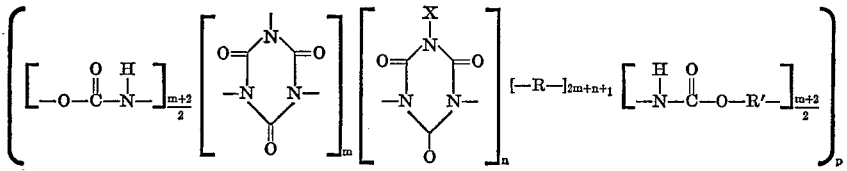

said process comprising in sequence the steps of:
(a) reacting OCN-R-NCO with XNCO in the presence of an aprotic solvent to form an isocyanurate-containing compound having the structure:

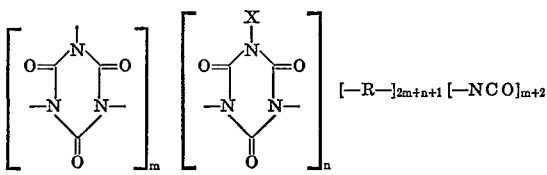

(b) reacting said isocyanurate-containing compound with HOR'OH in the presence of an aprotic solvent, wherein
R=divalent hydrocarbon or substituted hydrocarbon radical, containing 1 to about 40 carbon atoms, X is selected from the group consisting of metals or quaternary ammonium radicals, R' is a divalent hydrocarbon radical or substituted hydrocarbon radical containing from 1 to about 40 carbon atoms, wherein $m$ is the number of trisubstituted isocyanurate rings per molecule and is a positive integer from zero to about 2000, $n$ is the number of isocyanurate salt groups and is a positive integer from 1 to about 10,000, wherein $2m+n+1=$ the number of divalent R groups and is a positive integer from 2 to about 14,000, and wherein $p=$ the number of repeating units (mers) in the polymer; for individual molecules $p$ is an integer from about 1 to about 2000, wherein the average value of $m$ for said mixture is from about 1 to about 1,000, the average value of $n$ for said mixture is from about 1 to about 5,000, and the average value of $p$ for said mixture is from about 1 to about 1,000, wherein OCN-R-NCO is reacted with XNCO in the presence of the aprotic solvent to form a first reaction mixture comprising molecules having the structure:

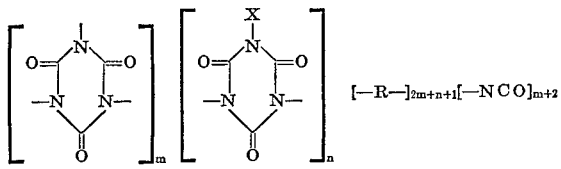

and wherein said first reaction mixture without substantial purification, is thereafter contacted with HOR'OH to form a second product mixture, said second product mixture comprising groups having the structure:

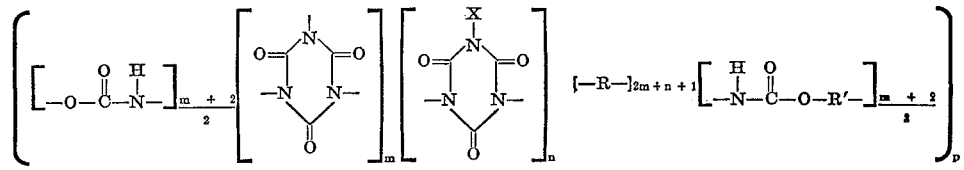

3. A process according to Claim 2 wherein R and R' are selected from the group of organic radicals consisting of

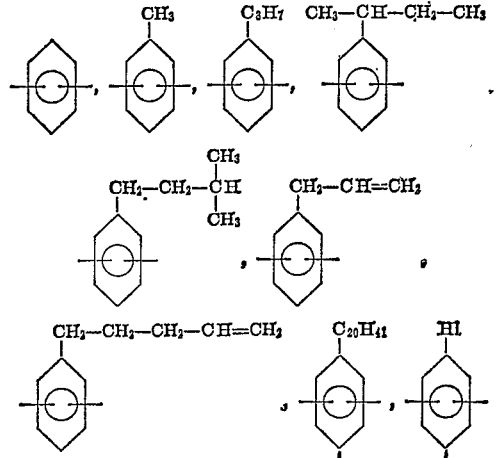

(where Hl=F, Cl, Br or I),

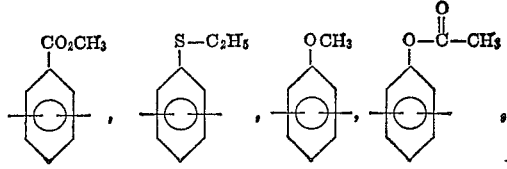

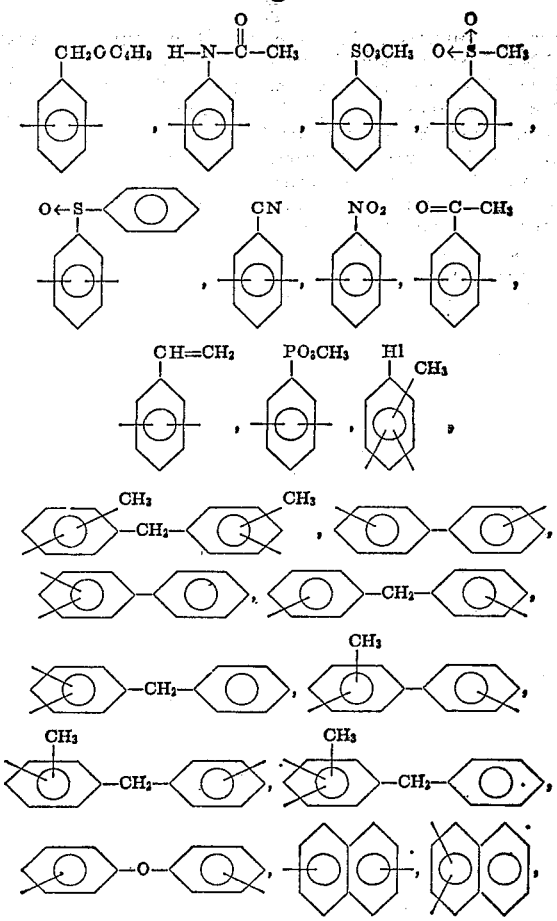

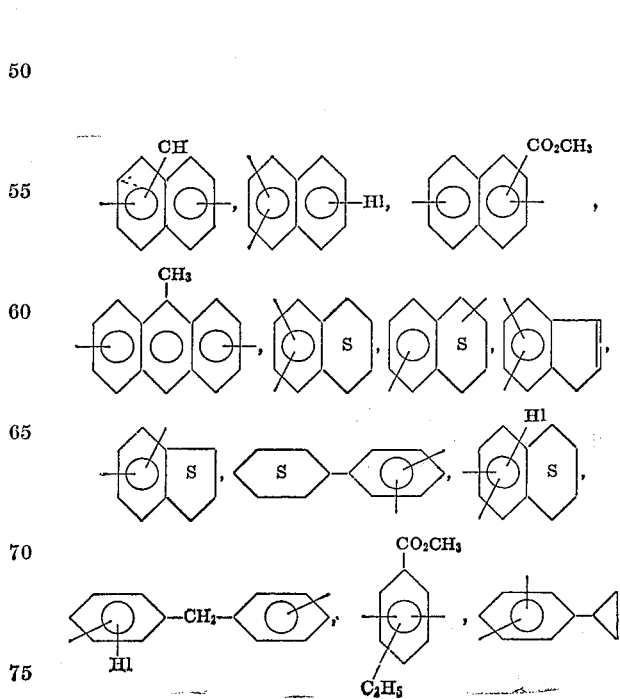

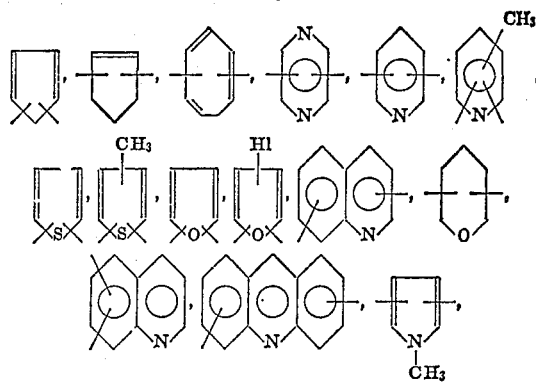
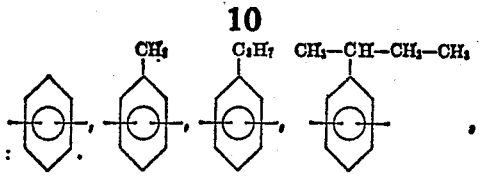

Alkyl: (S=Saturated)

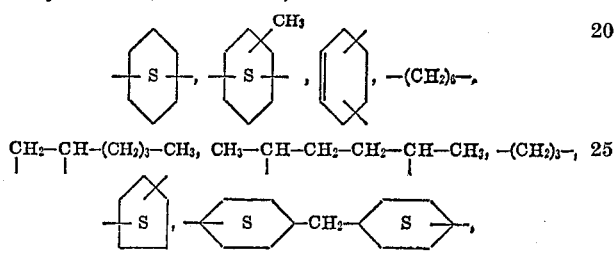
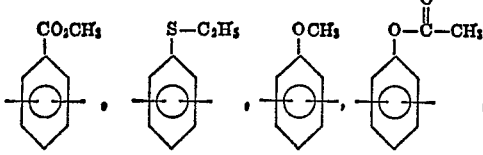

20 (where Hl=F, Cl, Br or I),

Aralkyl:

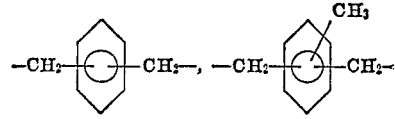
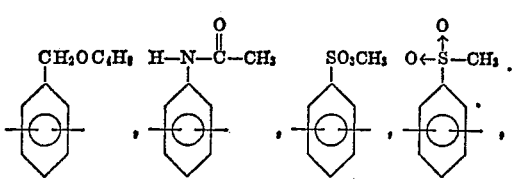

Arylaralkyl:

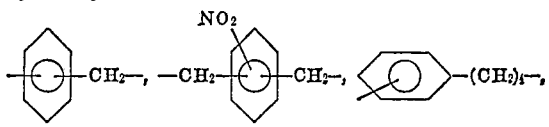
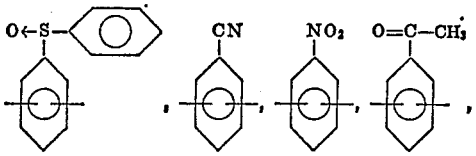

Alkene:
$-CH_2-CH=CH-CH_2-$, $-CH_2-CH=C-CH_3$, $-CH=CH-CH=CH-$,
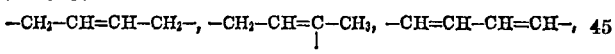

Polymeric:

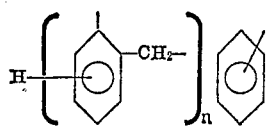

(Where $n$ may be from 1 to 50)

Bicyclic:

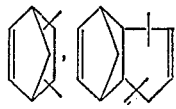

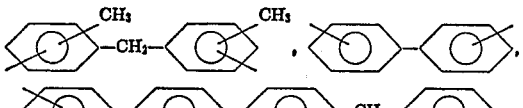
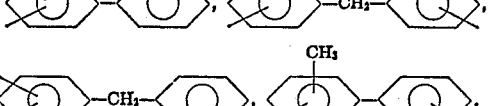
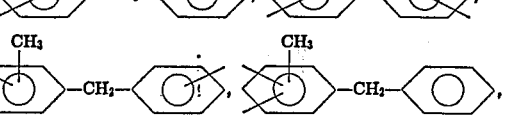

4. Compositions according to Claim 1 wherein X is selected from the group consisting of hydrogen, quaternary ammonium radicals and metal radicals selected from the following groups of the Periodic Table; Ia, Ib, IIa, IIb, IIIa, IIIb, IVa, IVb, Va, Vb, VIa.

5. Compositions according to Claim 1 wherein $m$ is a positive integer from 1 to about 200, wherein $n$ is a positive integer from 2 to about 1000, and wherein $2m+n+1$ is a positive integer from about 5 to about 1400, and wherein $p$ is an integer from about 1 to about 1000.

6. Compositions according to Claim 1 wherein R is selected from the group of organic radicals shown in the following structures:

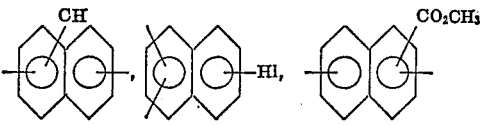

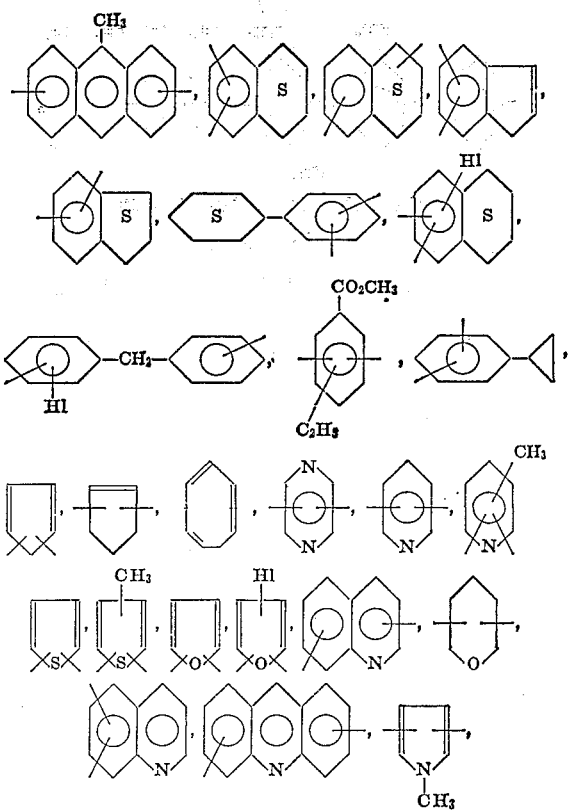

Alkyl: (S=Saturated)

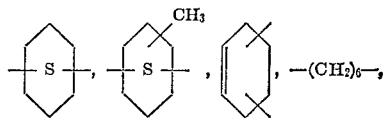

$CH_2-CH-(CH_2)_3-CH_3$, $CH_3-CH-CH_2-CH_2-CH-CH_3$, $-(CH_2)_3-$,

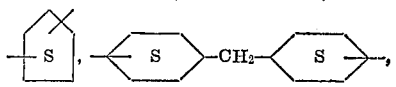

Aralkyl:

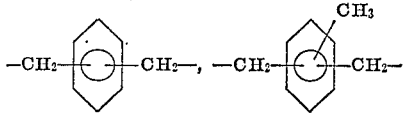

Arylaralkyl:

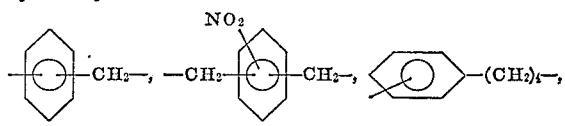

Alkene:
$-CH_2-CH=CH-CH_2-$, $-CH_2-CH=C-CH_3$, $-CH=CH-CH=CH-$

Polymeric:

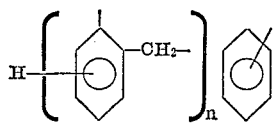

(Where $n$ may be from 1 to 50)

Bicyclic:

and the substituted derivatives thereof which are substituted with radicals selected from the group consisting of —NO$_2$, Cl, F, Br, I, CN, —CO$_2$R″, —CO—R″, —O—R″, —SR″, NR$_2$″, —CONR$_2$), —SO$_3$R″, —SO$_2$—, —SO—, phenyl, naphthyl, alkyl (1–40 carbon atoms), cyclohexyl, cyclopropyl,

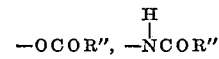

where R″ may be lower alkyl or aryl monovalent radicals.

7. A composition according to Claim 1 wherein R′ contains from 1 to 20 carbon atoms and is selected from the group consisting of —C$_2$H$_4$, —C$_3$H$_6$—,

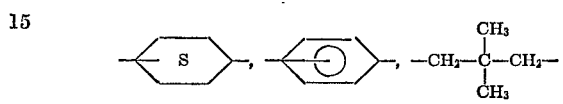

8. A process according to Claim 2 wherein X is selected from the group consisting of quaternary ammonium radicals and metal radicals selected from the following groups of the Periodic Table; Ia (except hydrogen), Ib, IIa, IIb, IIIa, IIIb, IVa, IVb, Va, Vb, VIa.

9. A process according to Claim 2 wherein $m$ is a positive integer from 1 to about 200, wherein $n$ is a positive integer from 2 to about 1000, and wherein $2m+n+1$ is a positive integer from about 5 to about 1400, and wherein $p$ is a positive integer from 1 to about 1000.

10. A process according to Claim 2 wherein R is selected from the group of organic radicals shown in the following structures:

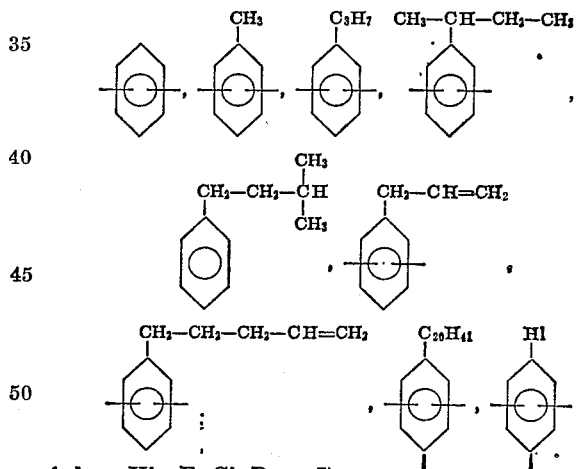

(where Hl=F, Cl, Br or I),

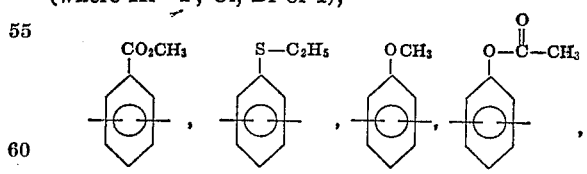

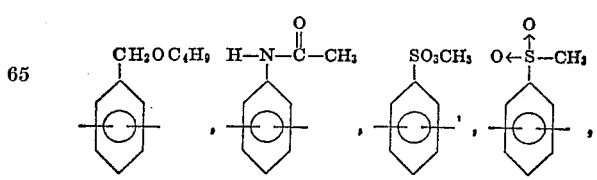

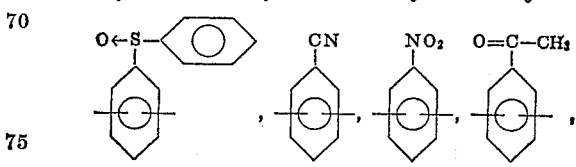

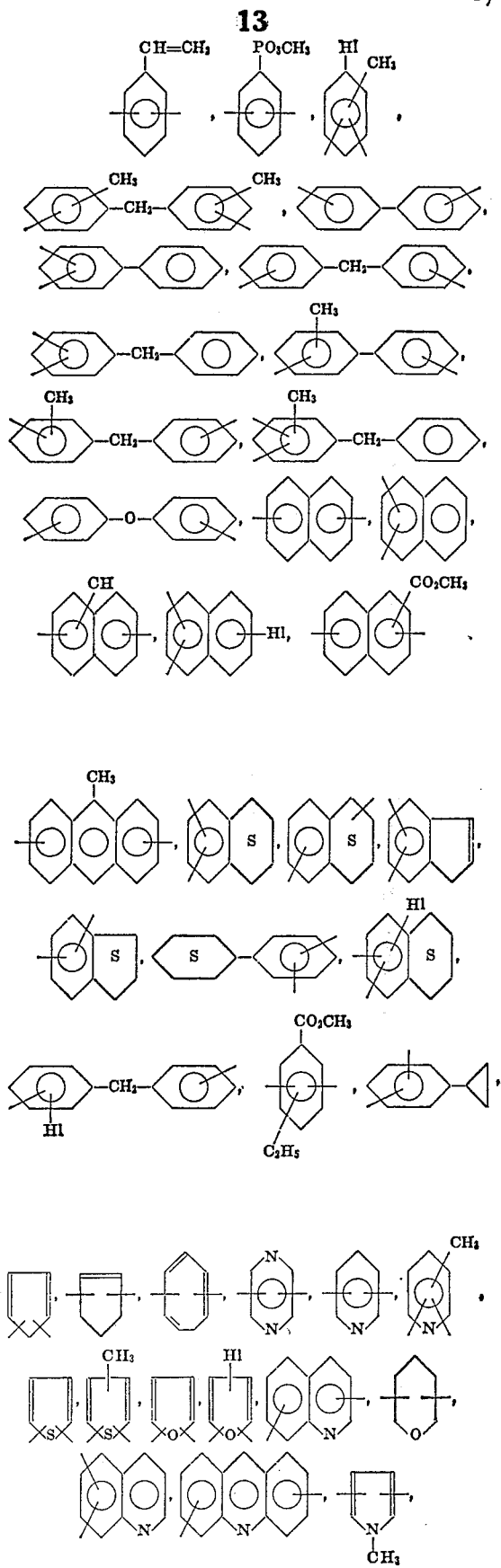

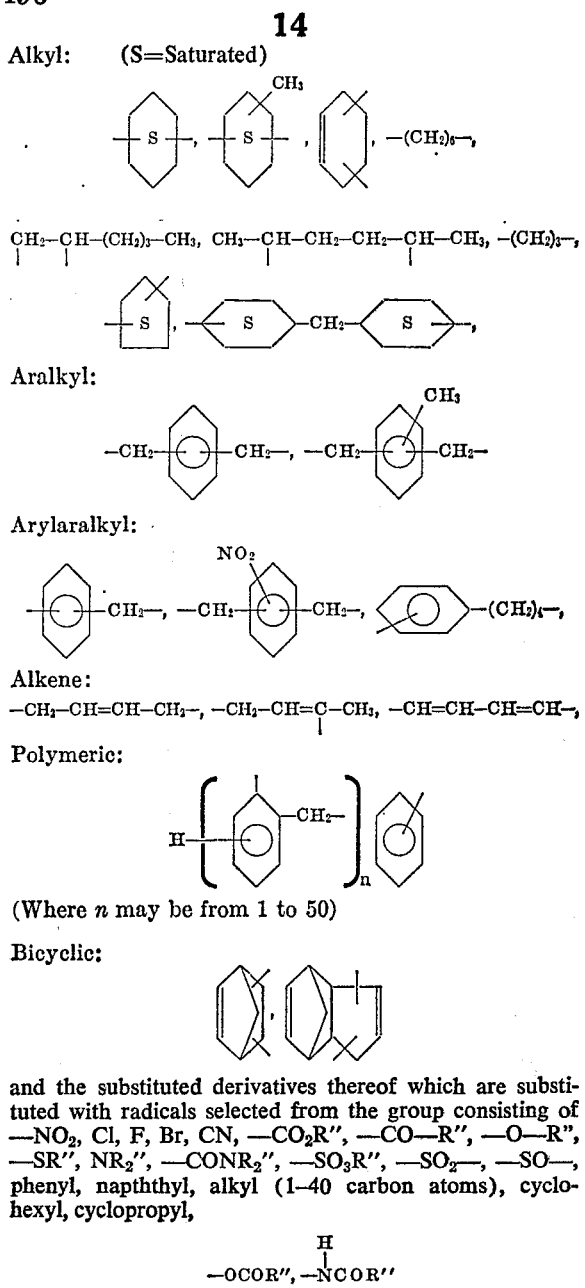

and the substituted derivatives thereof which are substituted with radicals selected from the group consisting of —NO₂, Cl, F, Br, CN, —CO₂R″, —CO—R″, —O—R″, —SR″, NR₂″, —CONR₂″, —SO₃R″, —SO₂—, —SO—, phenyl, napthyl, alkyl (1-40 carbon atoms), cyclohexyl, cyclopropyl, $$-OCOR'', -\overset{H}{N}COR''$$

where R″ is lower alkyl or aryl monovalent radicals.

11. A process according to Claim 2 where R′ contains from 1 to 20 carbon atoms and is selected from the group consisting of —C₂H₄, —C₃H₆—,

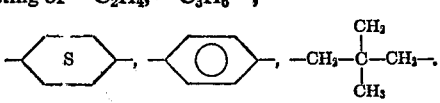

References Cited
UNITED STATES PATENTS 3,573,259  3/1971  Argabright et al. _ 260—77.5 NC
3,517,002  6/1970  Heiss _____ 260—77.5 NC M. J. WELSH, Primary Examiner U.S. Cl. X.R.
260—248 NS

UNITED STATES PATENT OFFICE
CERTIFICATE OF CORRECTION

Patent No. 3,840,496　　　　　　　　Dated October 8, 1974

Inventor(s) P. A. Argabright, et al

It is certified that error appears in the above-identified patent and that said Letters Patent are hereby corrected as shown below:

Col. 2, Line 64: "1 to 500" should read --2 to 500--

Col. 3, Line 74: "Cc" should read --Cs--

Col. 6, Line 41: "(mers)" should be deleted per 312 Amendment

Col. 6, Line 65: Figure should be amended per 8/28/73 Amendment

Col. 7, Line 16: "(mers)" should be deleted per 312 Amendment

Col. 12, Line 4: " $-CONR_2$) " should read -- $-CONR_2$" --

Col. 12, Line 14: " $-C_2H_4$ " should read -- $-C_2H_4-$ --

Col. 14, Line 46: After Br, insert --I,--

Col. 14, Line 56: " $-C_2H_4$ " should read -- $-C_2H_4-$ --

Signed and Sealed this twentieth Day of January 1976

[SEAL]

Attest:

RUTH C. MASON　　　　　　　　C. MARSHALL DANN
*Attesting Officer*　　　　　　　　*Commissioner of Patents and Trademarks*